(12) United States Patent
Hwang et al.

(10) Patent No.: US 8,655,411 B2
(45) Date of Patent: Feb. 18, 2014

(54) METHOD AND APPARATUS OF DISPLAYING A CHARACTER INPUT IN A PORTABLE TERMINAL

(75) Inventors: Byeong-Cheol Hwang, Seoul (KR); Sun-Young Yi, Seoul (KR)

(73) Assignee: Samsung Electronics Co., Ltd (KR)

( * ) Notice: Subject to any disclaimer, the term of this patent is extended or adjusted under 35 U.S.C. 154(b) by 1658 days.

(21) Appl. No.: 11/503,278

(22) Filed: Aug. 11, 2006

(65) Prior Publication Data

US 2007/0049268 A1 Mar. 1, 2007

(30) Foreign Application Priority Data

Aug. 23, 2005 (KR) .................. 10-2005-0077200

(51) Int. Cl.
- *H04B 1/38* (2006.01)
- *H04M 1/00* (2006.01)
- *H03K 17/94* (2006.01)
- *H03M 11/00* (2006.01)
- *G06F 3/02* (2006.01)
- *G09G 5/00* (2006.01)
- *G06F 3/041* (2006.01)
- *G06F 17/00* (2006.01)
- *G06F 17/20* (2006.01)
- *G06F 17/21* (2006.01)
- *G06F 17/22* (2006.01)
- *G06F 17/24* (2006.01)
- *G06F 17/25* (2006.01)
- *G07F 17/26* (2006.01)
- *G06F 17/27* (2006.01)
- *G06F 17/28* (2006.01)

(52) U.S. Cl.
USPC ............... 455/566; 455/550.1; 455/575.1; 341/28; 345/168; 345/173; 715/210

(58) Field of Classification Search
USPC ........ 455/428, 550.1, 556.2, 563, 566, 575.1, 455/466; 345/156, 168, 169, 171, 173, 428; 704/3, 10; 715/201, 210, 243, 269, 715/810, 827, 535
See application file for complete search history.

(56) References Cited

U.S. PATENT DOCUMENTS

| | | | |
|---|---|---|---|
| 5,592,602 A * | 1/1997 | Edmunds et al. | 345/474 |
| 6,073,036 A * | 6/2000 | Heikkinen et al. | 455/550.1 |
| 6,728,935 B1 * | 4/2004 | Uchijima et al. | 715/210 |
| 6,822,585 B1 * | 11/2004 | Ni et al. | 341/28 |
| 6,864,809 B2 * | 3/2005 | O'Dell et al. | 341/28 |
| 7,320,111 B2 * | 1/2008 | Volovitz | 715/827 |
| 2002/0077808 A1 * | 6/2002 | Liu et al. | 455/566 |
| 2003/0027601 A1 * | 2/2003 | Guo et al. | 455/566 |
| 2004/0140956 A1 * | 7/2004 | Kushler et al. | 345/168 |
| 2004/0164951 A1 * | 8/2004 | Lun Pun et al. | 345/156 |
| 2005/0144566 A1 * | 6/2005 | Zhang | 715/810 |
| 2005/0162395 A1 * | 7/2005 | Unruh | 345/169 |
| 2006/0242576 A1 * | 10/2006 | Nagel et al. | 715/535 |
| 2006/0294462 A1 * | 12/2006 | Blair et al. | 715/535 |

* cited by examiner

*Primary Examiner* — Yuwen Pan
*Assistant Examiner* — Paul P Tran
(74) *Attorney, Agent, or Firm* — The Farrell Law Firm, P.C.

(57) ABSTRACT

Disclosed is a method for displaying a character input in a portable terminal and an apparatus thereof. The method includes determining whether a dynamic input effect is set when a character input mode is started, and displaying a character corresponding to a key input if it is determined that the dynamic input effect is set. Accordingly, various methods of displaying an input character in the portable terminal can be provided.

12 Claims, 8 Drawing Sheets

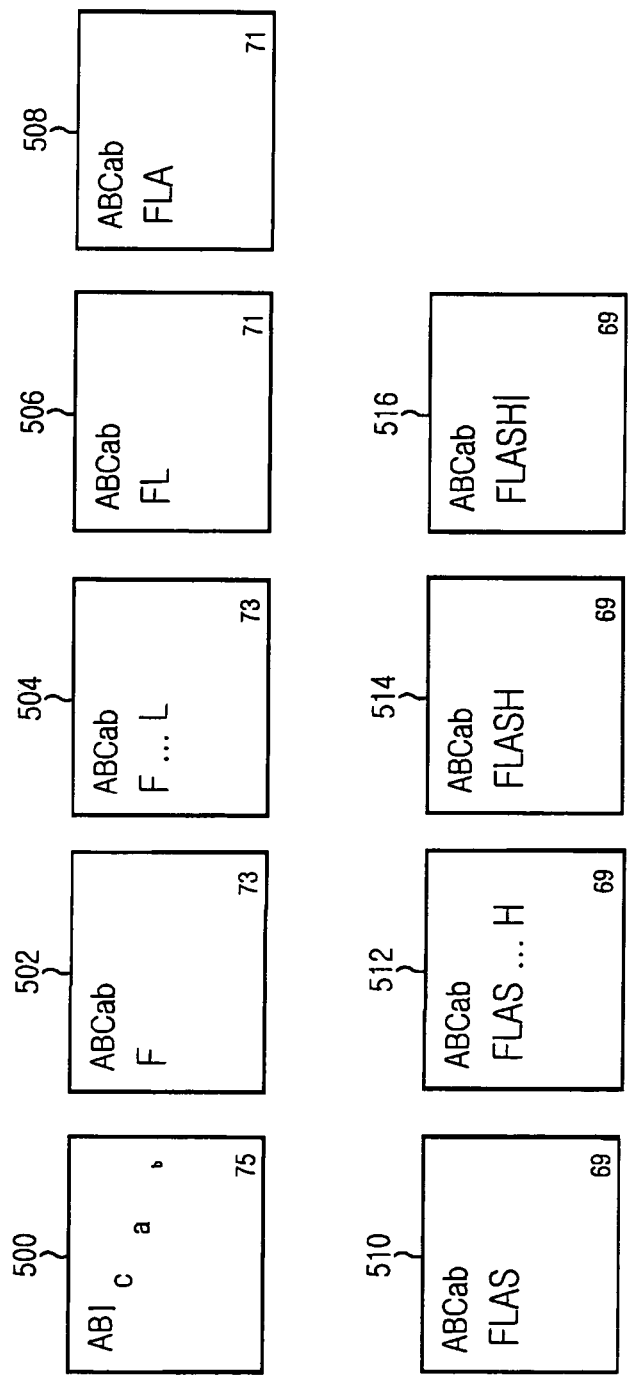

METHOD AND APPARATUS OF DISPLAYING A CHARACTER INPUT IN A PORTABLE TERMINAL

PRIORITY

This application claims priority under 35 U.S.C. §119 to an application entitled "Method Of Displaying A Character Input In A Portable Terminal" filed in the Korean Intellectual Property Office on Aug. 23, 2005 and assigned Ser. No. 2005-77200, the contents of which are incorporated herein by reference.

BACKGROUND OF THE INVENTION

1. Field of the Invention

The present invention relates to a method and an apparatus of displaying a character input in a portable terminal, and in particular, to a method and an apparatus of displaying multiple character input by providing a character having a movement effect when the character corresponding to a key input is displayed in a character input mode.

2. Description of the Related Art

Along with the rapid development of communication systems, portable terminals such as mobile communication terminals, DMB (Digital Multimedia Broadcasting) terminals or PDAs (Personal Digital Assistants) have become commonplace. In addition to mobile wireless call communication functions, portable terminals can now provide a plurality of other functions. For example, portable functions such as a background screen setting function, an SMS (short message service) message function, an MPEG (Motion Picture Experts Group) Layer 3 function, a wireless Internet function, a digital camera function, a TV function, VOD (Video-On-Demand) function, etc. Particularly, an SMS message function for transmitting or receiving a written message and phone book function for making a corresponding call by searching a stored telephone number are related with a character input function.

Portable terminals typically display various characters when using a character input or display function. Although conventional portable terminals display characters using fonts that are set by the portable terminal's manufacturer or service provider, users may desire to display a personalized font. However, conventional portable terminals do not provide the user with an option to change a character's font according to the user's setting. Rather, conventional portable terminals display characters using font set at the time of manufacture.

A typical character input display will be described with reference to FIG. 1.

FIG. 1 is an illustration showing a conventional method of displaying characters in a portable terminal.

Referring to FIG. 1, step 100 is an initial screen for writing a new message. In steps 102 to 108, in a character input mode the characters 'Ahn' are input and displayed. In step 110, the character 'n' is deleted from the previously input characters 'Ahn' when a cancel key is selected by the user.

Although personalization of portable terminals is desirable, conventional portable terminals merely display a character corresponding to key input by a user at the position where a cursor is blinking and only provide a function of the user to change a background screen. Moreover, in conventional portable terminals, a background screen image is not correlated with a selected character display mode. Therefore, a user cannot personalize his or her portable terminal to fully reflect the user's individual taste.

In other words, standardized uniform character input displays of conventional portable terminals cannot meet a user's desire to customize the display. Accordingly, a method and an apparatus of providing new and dynamic character input display are necessary.

SUMMARY OF THE INVENTION

Accordingly, it is an object of the present invention to provide a method and an apparatus for displaying characters having a dynamic input effect in a portable terminal.

It is another object of the present invention to provide a method and an apparatus for displaying characters having a dynamic input skin including a changing background corresponding to input characters in a portable terminal.

Accordingly, to achieve the above and other objects of the present invention, there is provided a method for customizing a display of a portable terminal, the method including determining whether a dynamic input effect is set when character input mode is started, and displaying a character having a dynamic input effect corresponding to key input if it is determined that the dynamic input effect has been set. Also, an apparatus implementing the aforementioned method is provided.

Accordingly, to achieve the above and other objects of the present invention, there is also provided a method including determining whether a dynamic input skin is set when character input mode started in a portable terminal and displaying a character having a dynamic input skin corresponding to key input if it is determined that the dynamic input skin has been set. Also, an apparatus implementing the aforementioned method is provided.

BRIEF DESCRIPTION OF THE DRAWINGS

The above and other objects, features, and advantages of the present invention will become more apparent from the following detailed description when taken in conjunction with the accompanying drawings in which:

FIG. 5 is an illustration showing a process of displaying a character input on a display unit with 'fly in' dynamic input effect according to the present invention;

DETAILED DESCRIPTION OF THE PREFERRED EMBODIMENTS

Preferred embodiments of the present invention will be described herein below with reference to the accompanying drawings. In the following description, well-known functions or constructions are not described in detail.

The present invention provides a method and an apparatus of displaying a character having a dynamic input effect or skin in a portable terminal, which will be described with reference to FIGS. 2 to 8.

According to the present invention, the terms "character" and/or "characters" can include various characters such as those that are used by various languages. For example, the term characters can include Korean, English, etc., characters. Moreover, the term characters can include special characters (e.g., @, #, *, $, etc.), and numerals (e.g., 1, 2, . . . ; I, II, . . . , etc.).

Figure 1:
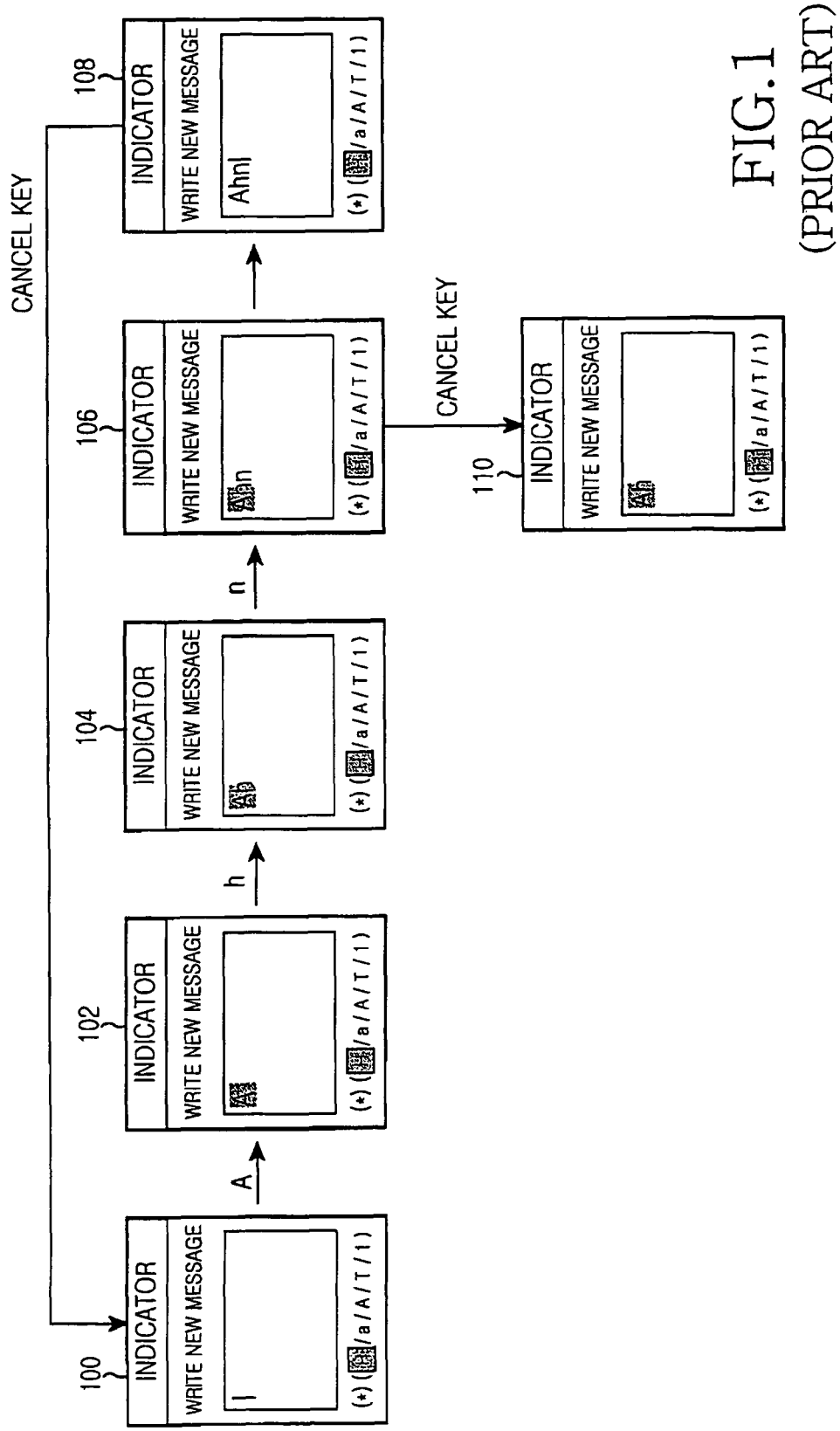
FIG. 1 is an illustration showing a conventional method of displaying characters input in a portable terminal.
Figure 2:
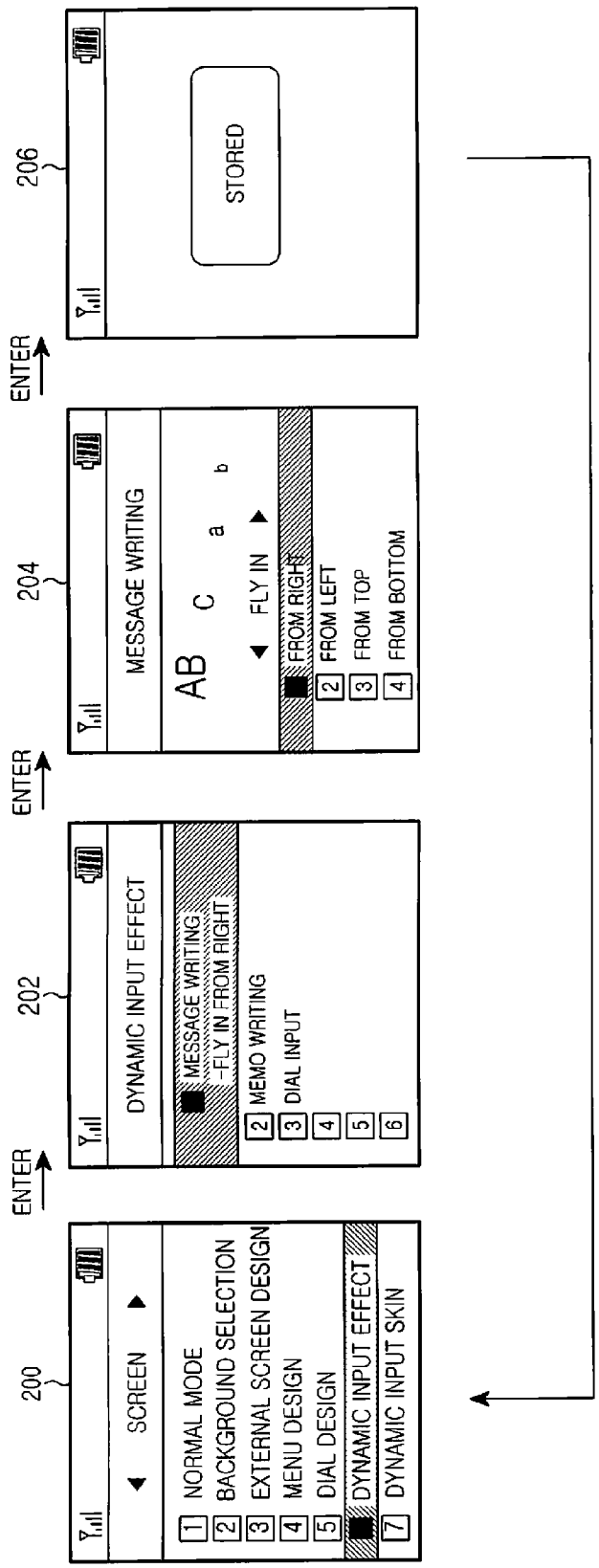
FIG. 2 is an illustration showing a process of selecting and setting a character having a dynamic input effect according to the present invention.

FIG. 2 is an illustration showing a process of selecting and setting a character having a dynamic input effect according to the present invention.

Referring to FIG. 2, if a dynamic input effect mode is selected from a menu list in step 200, the user selects functions (e.g., a character input function, a message writing function, a memo writing function, a dial input function, etc.) to which the dynamic input effect mode should be applied, in step 202.

If a dynamic input effect is selected in step 202 and a preview screen for checking the selected dynamic input effect is displayed in step 204. The dynamic input effect is selected by using left and/or right navigation (or directional) keys (e.g., ◄ and/or ►) and the detail of the dynamic input effect is selected by using up and/or down navigation keys (e.g., ▲ and/or ▼) or numerical keys.

Next, the dynamic input effect is stored and the process of setting the dynamic input effect is ended in step 206.

The dynamic input effect described above causes an input character to "fly in" from a previous set direction when the character is input. In other words, an input character travels across the screen using 'fly in' effect when the character is input. The dynamic input effect includes 'fly from right', 'fly from top', 'fly from bottom', 'become smaller', 'become smaller and wave', '3 dimensional spin and become smaller', 'become larger', 'flat to large', 'large to small to large', 'spin and appear', '3 dimensional spin and drop' or 'spin and appear', etc. but is not limited to such. Input characters can also be displayed using various effects which can depict movement, rotation and/or changes in lighting, shading, size, color, etc., when the character corresponding to a key input is displayed.

Figure 3:
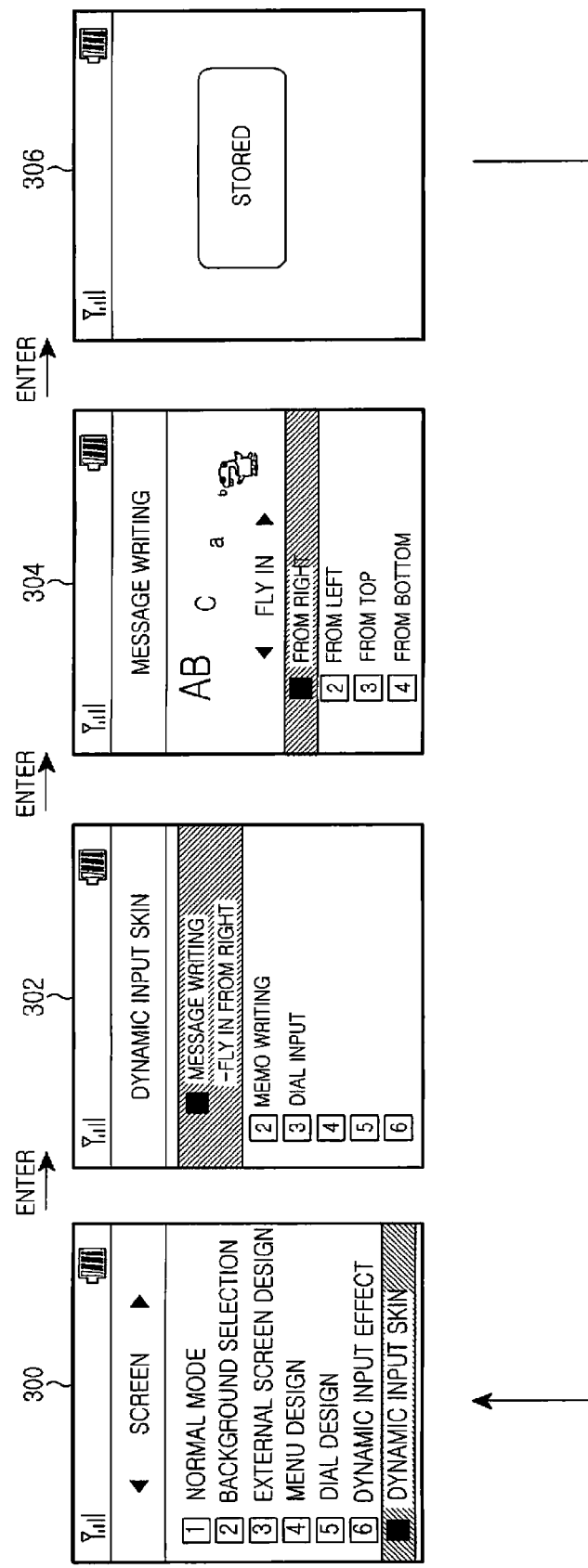
FIG. 3 is an illustration showing a process of selecting and setting a character having a dynamic input skin according to the present invention.

FIG. 3 is an illustration showing a process of selecting and setting a character having a dynamic input skin according to the present invention.

Referring to FIG. 3, if dynamic input skin mode is selected from a menu list in step 300, functions (e.g., a message writing, memo writing and/or dial inputting functions) to which a dynamic input skin mode should be applied are selected, in step 302.

If the function is selected, a preview screen for checking the selected dynamic input skin is displayed in step 304. The dynamic input skin is selected by using left and right navigation keys (i.e., direction keys) (i.e., ▲ and/or ▼), and the detail of the dynamic input skin are selected using up and/or down navigation keys or numeric keys.

Next, the dynamic input skin is stored and the process of setting the dynamic input skin is ended in step 306.

The dynamic input skin of FIG. 3 can be configured with the dynamic input effect of FIG. 2 and a dynamic background. The dynamic background changes with correlation to the dynamic input effect being output according to an input key. For example, the 'fly in' of dynamic character skin makes one character in the dynamic input effect when a character image set as the dynamic background flies characters from its mouth according to key input.

Hereinafter, a difference between the dynamic input effect of FIG. 2 and the dynamic input skin of FIG. 3 will be described with reference to FIGS. 4A and 4B.

Figure 4A:
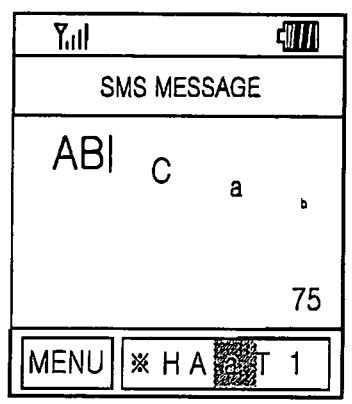
FIG. 4A is an illustration showing a process of inputting a message with a dynamic input effect according to the present invention.

FIG. 4A is an illustration showing a process of inputting a character message with a dynamic input effect according to the present invention.

Figure 4B:
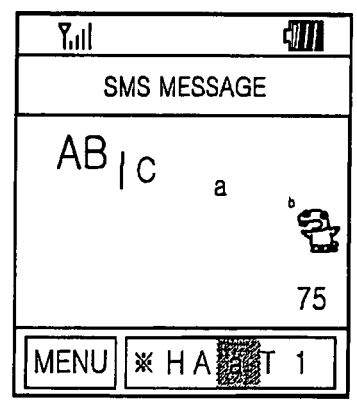
FIG. 4B is an illustration showing a process of inputting a message with a dynamic input skin according to the present invention.

FIG. 4B is an illustration showing a process of inputting a character message with a dynamic input skin according to the present invention.

That is, a difference between the dynamic input effect and the dynamic input skin is distinguished depending on the existence of a dynamic background. The dynamic background means a moving background having correlation to the dynamic input effect according to a key input.

Hereinafter, the dynamic input effect will be described with reference to FIGS. 5 and 6.

FIG. 5 is an illustration showing a process of displaying character input on a display unit with 'fly in' dynamic input effect according to the present invention;

In steps 500 to 516, characters "ABCab FLASH" are displayed on a display unit with a 'fly in' dynamic input effect according to the present invention. A character corresponding to a key input is graphically generated at a predetermined point (which can be selected by the user). The input character then flies (i.e., travels) to a display position and grows larger as it travels. In the same fashion, steps 502-516 depict the word "FLASH" being formed using characters that fly-in from a predetermined point.

Figure 6:
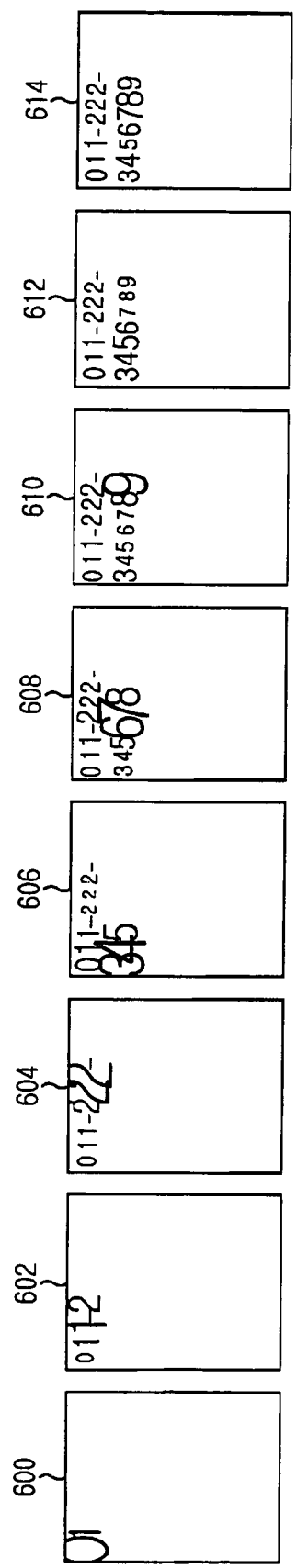
FIG. 6 is an illustration showing a process of displaying telephone number input on a display unit with 'become small and wave' dynamic input effect according to the present invention.

FIG. 6 is an illustration showing a process of displaying telephone number input on a display unit with 'become small and wave' dynamic input effect according to the present invention.

In steps 600 to 614, a phone number of "011-222-3456789" is displayed on a display unit with 'becoming small and wave' dynamic input effect.

A process of setting the dynamic input effect and the dynamic input skin will be described with reference to FIG. 7.

Figure 7:
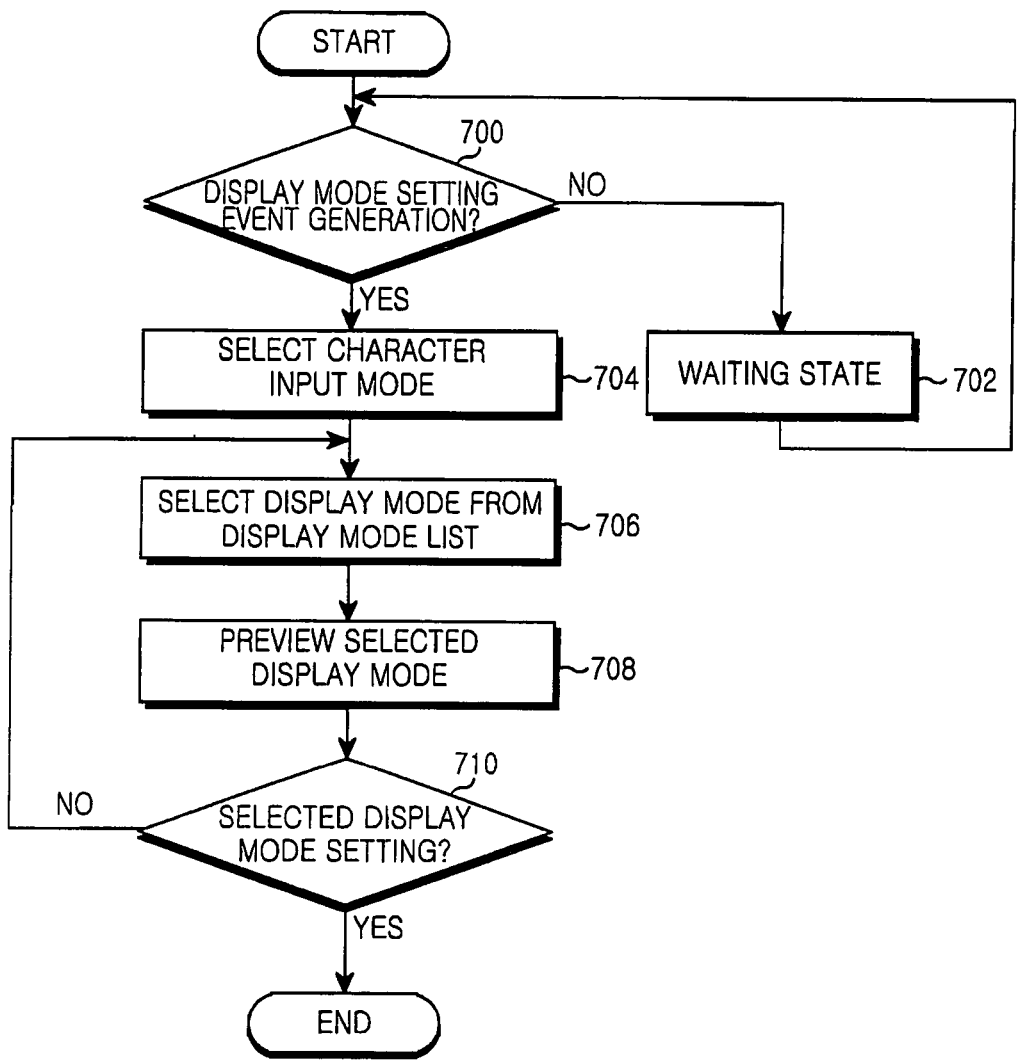
FIG. 7 is a flowchart illustrating a procedure of setting display mode in a portable terminal according to the present invention.

FIG. 7 is a flowchart illustrating a procedure of setting display mode in a portable terminal according to the present invention.

A portable terminal in a waiting state in step 702 proceeds to step 700 to check whether a display mode setting event is generated. If the display mode setting event is not generated, the portable terminal proceeds to step 702 to maintain the waiting state. However, if the display mode setting event is generated, the portable terminal proceeds to step 704 to select a character input mode. The character input mode includes a character message mode, a telephone input mode, and/or a memo input mode.

After selecting the character input mode, the portable terminal proceeds to step 706 to select a display mode from a list of the display mode. In step 708, a preview of the selected display mode is displayed. The preview graphically depicts a sample word or phase.

After the step 708, the portable terminal proceeds to step 710 to check whether the selected display mode is set. If the selected display mode is set, this process is ended, if not, it is returned to step 706.

The method of displaying character input in a portable terminal according to the present invention will be described with referred to FIG. 8.

Figure 8:
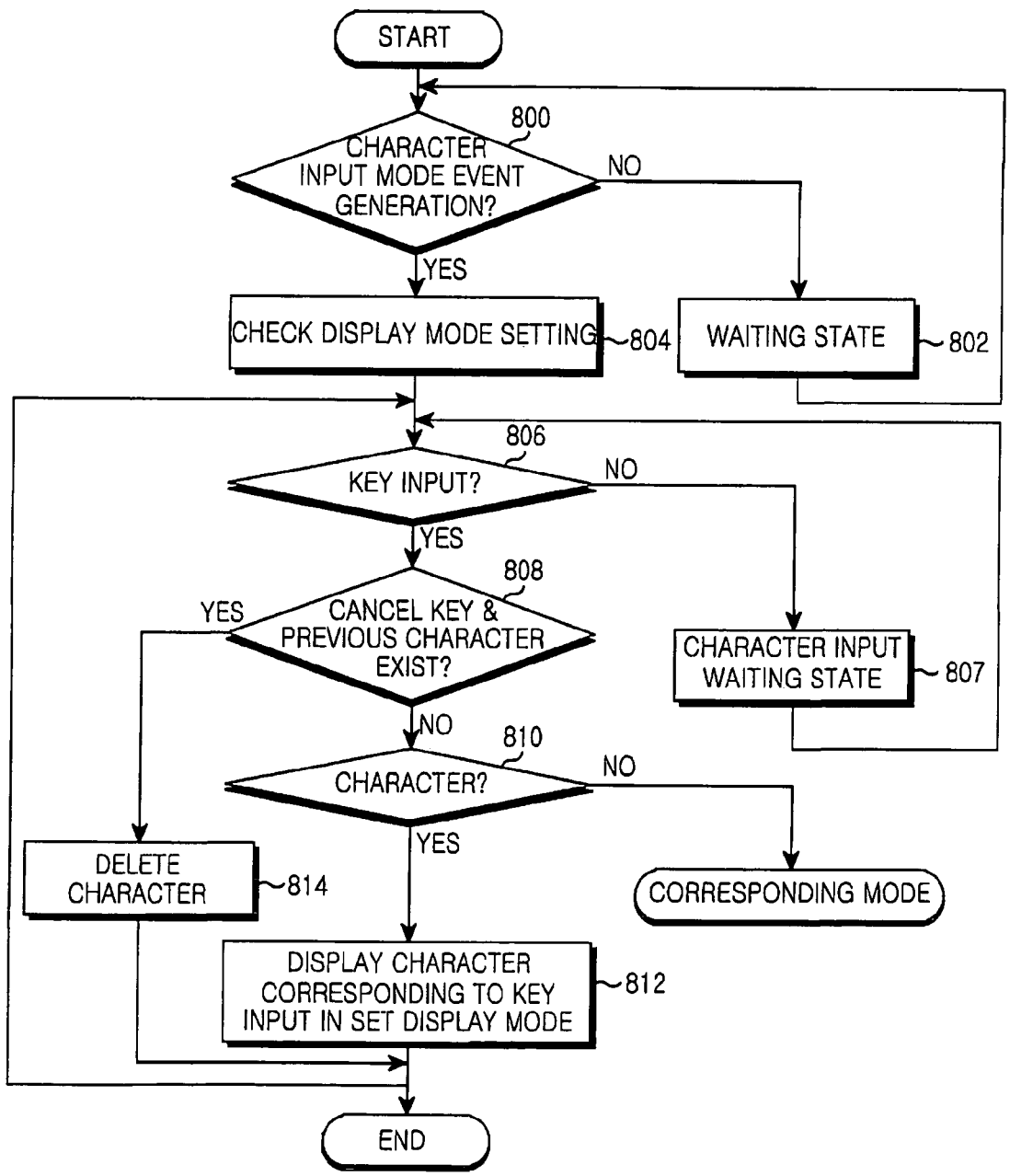
FIG. 8 is a flowchart illustrating a procedure of displaying character input in a portable terminal according to the present invention.

FIG. 8 is a flowchart illustrating a procedure of displaying character input in a portable terminal according to the present invention.

A portable terminal in a waiting state in step 802 proceeds to step 800 to check whether a character input mode event is generated. If the character input mode event is not generated, the portable terminal proceeds to step 802 to maintain the waiting state. However, in step 800, if the character input mode event is generated, the portable terminal proceeds to step 804 to check the setting of the display mode. The display mode setting may, for example, be a dynamic input effect or a dynamic input skin.

If the setting of display mode is identified in step 804, the portable terminal proceeds to step 806 to check whether key input exists. If there is no key input in step 806, the portable terminal proceeds to step 807 to maintain the character input waiting state. However, if there is key input in step 806, the portable terminal proceeds to step 808 to check if the key input is a cancel key and a previously input character exists. If the key input is a cancel key and the previous input character exists, it proceeds to step 814 to delete the previous input character. A method of character deletion in the present invention uses a conventional deleting method.

If it is determined that the key input is not the cancel key and the previously input character does not exist, in step 808, the portable terminal proceeds to step 810 to check if the key input is a character key input. If the key input is not the character key input, a function corresponding to the key input is carried out.

However, in step 810, if it is determined that the key input is the character key input, the portable terminal proceeds to step 812 to display a character according to a dynamic input effect or a dynamic input skin which corresponds with the display mode set in step 804.

As described above, the present invention relates to a character input display method for outputting a graphical effect such as movement and/or a changing background in a portable terminal. Accordingly, the present invention provides a method for uniquely setting a character input display according to a user's setting in a portable terminal.

Also, a portable communication terminal for implementing a character input display method for outputting a graphical effect such as movement and/or a changing background can be provided. The portable communication terminal employs a controlling means for processing the method described above and a display means for displaying screens in FIG. 2, FIG. 3, FIG. 4A, FIG. 4B, FIG. 5 and FIG. 6. The conventional elements in the portable communication terminal are also employed but are not described in detail.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of displaying a character in a portable terminal, the method comprising the steps of:
   previewing individual dynamic input effects on a plurality of characters in a preview screen corresponding to user navigation through a list of dynamic input effects and a list of details for each dynamic input effect;
   setting a dynamic input effect by selecting the dynamic input effect from the list of dynamic input effects and selecting a detail for the dynamic input effect;
   determining, when entering a character input mode, whether the dynamic input effect is set; and
   displaying a character corresponding to a key input, in a display for input characters, in accordance with the dynamic input effect selected from the list of dynamic input effects and the selected detail, if it is determined that the dynamic input effect is set;
   wherein the dynamic input effect includes a predetermined setting selected from at least one of a 'fly from right', 'fly from top', 'fly from bottom', 'spin and appear', '3 dimensional spin and drop' and 'spin and appear'.

2. The method of claim 1, wherein the character includes at least one of a Korean language character, an English language character, a special character, and a numeric character.

3. The method of claim 1, wherein the dynamic input effect includes a change in at least one of lighting, shading, color, or rotation, when the character corresponding to the key input is displayed.

4. A character input display method in a portable terminal, the method comprising the steps of:
   previewing individual dynamic input skins on a plurality of characters in a preview screen corresponding to user navigation through a list of dynamic input skins and a list of details for each dynamic input skin;
   setting a dynamic input-skin by selecting the dynamic input skin from the list of dynamic input skins and selecting a detail for the dynamic input skin;
   determining whether the dynamic input skin is set when a character input mode is started; and
   displaying a character corresponding to a key input, in a display for input characters, in accordance with the dynamic input skin selected from the list of dynamic input skins and the selected detail, if the dynamic input skin is set;
   wherein the dynamic input skin is configured with a dynamic input effect and a dynamic background, wherein the dynamic background is correlated to the dynamic input effect; and;
   wherein the dynamic input effect includes a change in at least one of lighting, shading, color, or rotation, when the character corresponding to the key input is displayed.

5. The method of claim 4, wherein the character includes a Korean language character, an English language character, a special character or a numeric character.

6. A method of displaying a character in a portable terminal, the method comprising:
   displaying a character corresponding to a key input, in a display for input characters, in accordance with a dynamic input effect and a detail of the dynamic input effect, if the dynamic input effect is set,
   wherein the dynamic input effect is set by selecting a character input mode to be applied, outputting a list of dynamic input effects and details for each dynamic input effect, and selecting the dynamic input effect from the list of dynamic input effects and selecting the detail for the dynamic input effect;
   wherein the dynamic input effect includes a predetermined setting selected from at least one of a 'fly from right', 'fly from top', 'fly from bottom', 'spin and appear', '3 dimensional spin and drop' and 'spin and appear'.

7. The method of claim 6, further comprising
   previewing a predetermined character with the selected dynamic input effect.

8. The method of claim 6, wherein the dynamic input effect includes a change in at least one of lighting, shading, color, or rotation, when a character corresponding to the key input is displayed.

9. A character input display method in a portable terminal, the method comprising:
- displaying a character corresponding to a key input, in a display for input characters, in accordance with a dynamic input skin and a detail of the dynamic input skin, if a dynamic input skin setting is selected,
- wherein the dynamic input skin is set by outputting a list of dynamic skin effects and details for each dynamic input skin, and selecting the dynamic input skin from the list of dynamic input skins and selecting the detail for the dynamic input skin;
- wherein the dynamic input skin is configured with a dynamic input effect and a dynamic background wherein the dynamic background corresponds with the dynamic input effect and changes according to the key input; and
- wherein the dynamic input effect includes a change in at least one of lighting, shading, color or rotation, when the character corresponding to key input is graphically depicted.

10. The method of claim 9, further comprising
- previewing a predetermined character with the selected dynamic input skin.

11. A method of displaying a character in a portable terminal, the method comprising the steps of:
- previewing individual dynamic input effects on a plurality of characters in a preview screen corresponding to user navigation through a list of dynamic input effects and a list of details for each dynamic input effect;
- setting a dynamic input effect by selecting the dynamic input effect from the list of dynamic input effects and selecting a detail for the dynamic input effect;
- determining, when entering a character input mode, whether the dynamic input effect is set; and
- displaying a character corresponding to a key input, in a display for input characters, in accordance with the dynamic input effect selected from the list of dynamic input effects and the selected detail, if it is determined that the dynamic input effect is set;
- wherein the dynamic input effect includes a predetermined setting selected from at least one of 'become smaller and wave', '3 dimensional spin and become smaller', 'flat to large', 'large to small to large' '3 dimensional spin and drop' and 'spin and appear'.

12. A method of displaying a character in a portable terminal, the method comprising:
- displaying a character corresponding to a key input, in a display for input characters, in accordance with a dynamic input effect and a detail of the dynamic input effect, if the dynamic input effect is set,
- wherein the dynamic input effect is set by selecting a character input mode to be applied, outputting a list of dynamic input effects and details for each dynamic input effect, and selecting the dynamic input effect from the list of dynamic input effects and selecting the detail for the dynamic input effect;
- wherein the dynamic input effect includes a predetermined setting selected from at least one of 'become smaller and wave', '3 dimensional spin and become smaller', 'flat to large', 'large to small to large' '3 dimensional spin and drop' and 'spin and appear'.

* * * * *